United States Patent [19]

Krasnov

[11] Patent Number: 5,682,400
[45] Date of Patent: Oct. 28, 1997

[54] SUPERSONIC AND SUBSONIC LASER WITH HIGH FREQUENCY DISCHARGE EXCITATION

[76] Inventor: Alexander V. Krasnov, 703 S. Pleasant St., Montpiellor, Ohio 43543

[21] Appl. No.: 534,796

[22] Filed: Sep. 27, 1995

[51] Int. Cl.$^6$ .................................................. H01S 3/097
[52] U.S. Cl. ........................ 372/82; 372/60; 372/86; 372/90; 372/701
[58] Field of Search ............................ 372/60, 82, 86, 372/89, 90, 701

[56] References Cited

U.S. PATENT DOCUMENTS

| | | | |
|---|---|---|---|
| Re. 29,103 | 1/1977 | Wilson et al. | |
| 3,543,179 | 11/1970 | Wilson | |
| 3,621,461 | 11/1971 | Perkins | |
| 3,681,710 | 8/1972 | Lary et al. | 372/90 |
| 3,694,770 | 9/1972 | Burwell et al. | 372/90 |
| 3,748,594 | 7/1973 | Pugh | |
| 3,998,393 | 12/1976 | Petty | 372/90 |
| 4,005,374 | 1/1977 | Levatter et al. | 372/35 |
| 4,064,465 | 12/1977 | Hundstad et al. | |
| 4,088,966 | 5/1978 | Samis | 372/90 |
| 4,100,507 | 7/1978 | Born et al. | 372/90 |
| 4,136,317 | 1/1979 | Stregack et al. | 372/90 |
| 4,194,169 | 3/1980 | Rich et al. | 372/90 |
| 4,200,819 | 4/1980 | Haslund | |
| 4,206,429 | 6/1980 | Pinsley | |
| 4,237,428 | 12/1980 | Wexler et al. | 372/90 |
| 4,251,781 | 2/1981 | Sutter, Jr. | |
| 4,413,345 | 11/1983 | Altmann | 372/90 |
| 4,457,000 | 6/1984 | Rao | |
| 4,598,406 | 7/1986 | Fino et al. | |
| 4,686,681 | 8/1987 | Paranto et al. | 372/82 |
| 4,805,182 | 2/1989 | Laakmann | |
| 4,837,772 | 6/1989 | Laakmann | |
| 4,841,537 | 6/1989 | Alexandrov et al. | 372/90 |
| 4,885,754 | 12/1989 | Egawa | |
| 4,937,834 | 6/1990 | Egawa | |
| 4,964,136 | 10/1990 | Egawa | |
| 4,974,229 | 11/1990 | Egawa | |
| 5,008,894 | 4/1991 | Laakmann | |
| 5,038,357 | 8/1991 | Lavarini et al. | |
| 5,067,135 | 11/1991 | Perzl et al. | 372/86 |
| 5,091,914 | 2/1992 | Maeda et al. | |
| 5,153,892 | 10/1992 | Kawakubo et al. | 372/86 |
| 5,200,971 | 4/1993 | Wildermuth et al. | |
| 5,206,875 | 4/1993 | Von Buelow et al. | |
| 5,206,876 | 4/1993 | van Buelow et al. | 372/90 |
| 5,239,553 | 8/1993 | Ono et al. | 372/86 |
| 5,313,486 | 5/1994 | Nakatani | 372/86 |
| 5,313,487 | 5/1994 | Fujikawa et al. | 372/86 |

FOREIGN PATENT DOCUMENTS 2226392  12/1973  Germany ..................... 372/701

*Primary Examiner*—Rodney B. Bovernick
*Assistant Examiner*—Robert E. Wise
*Attorney, Agent, or Firm*—Middleton & Reutlinger; John F. Salazar

[57] ABSTRACT

Disclosed is a gas laser utilizing high frequency discharge excitation in the area of sonic or supersonic/subsonic transfer gas flow. The laser uses various types of gases and mixtures of gases as the active medium and provides for pre-ionization of the gaseous medium before using high frequency discharge excitation. The gas is supplied into a receiver, and has downstream therefrom a supersonic nozzle for acceleration of the active gaseous flow to high subsonic or supersonic speeds in order to provide intensive dynamic cooling of the active gas medium. The gas is excited using high frequency discharge excitation in the critical area of the supersonic nozzle or downstream therefrom. The high frequency discharge and excitation can also occur within the optical resonator region which is located within the supersonic area of the nozzle. The present invention provides compact, efficient and super-powerful continuous, quasi-continuous and pulse laser systems with wavelengths from 0.3 mkm to 10.6 mkm with a high quality output beam. The present laser device may be utilized in scientific, commercial, aerospace and free space applications.

70 Claims, 15 Drawing Sheets

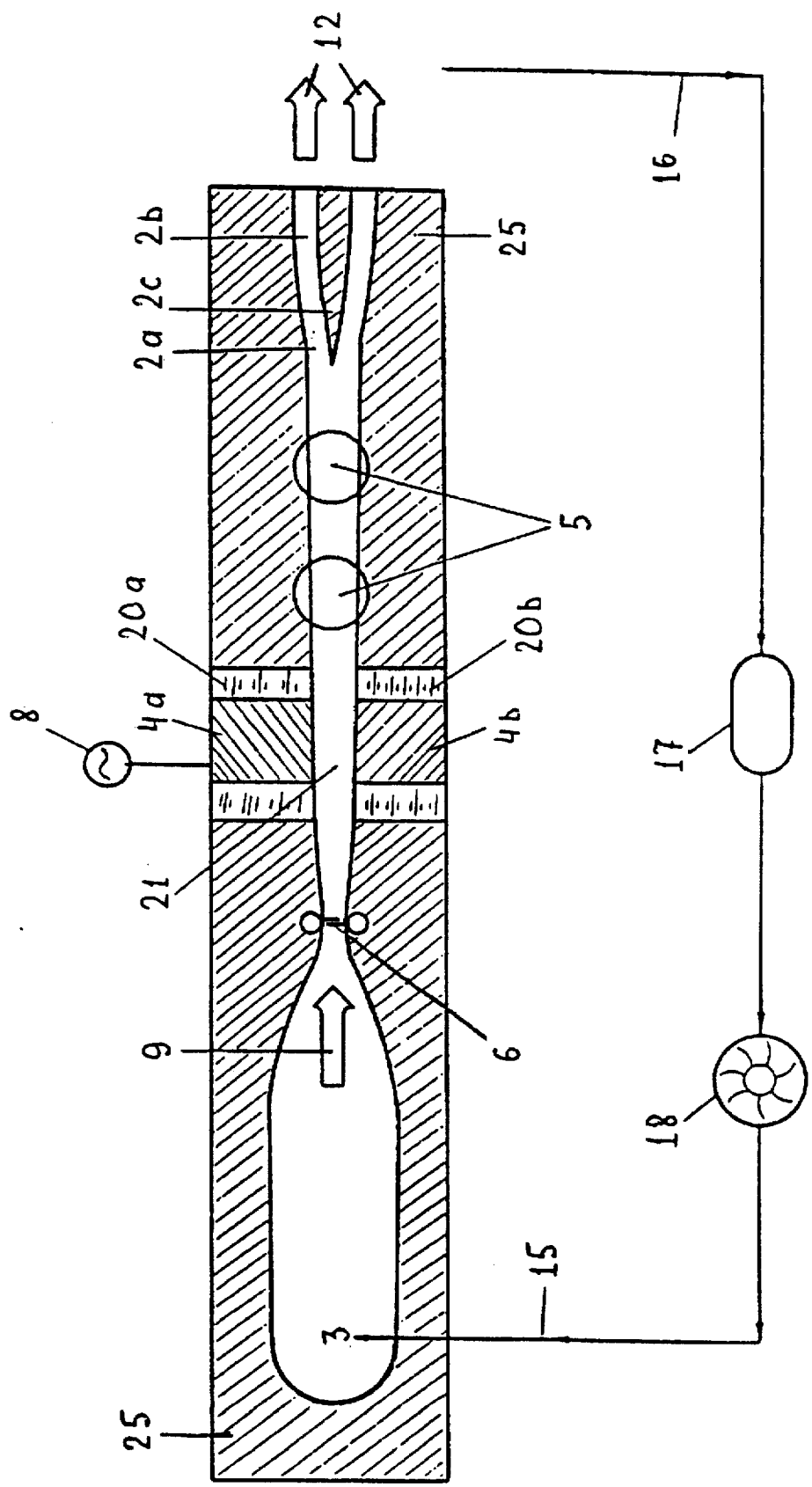

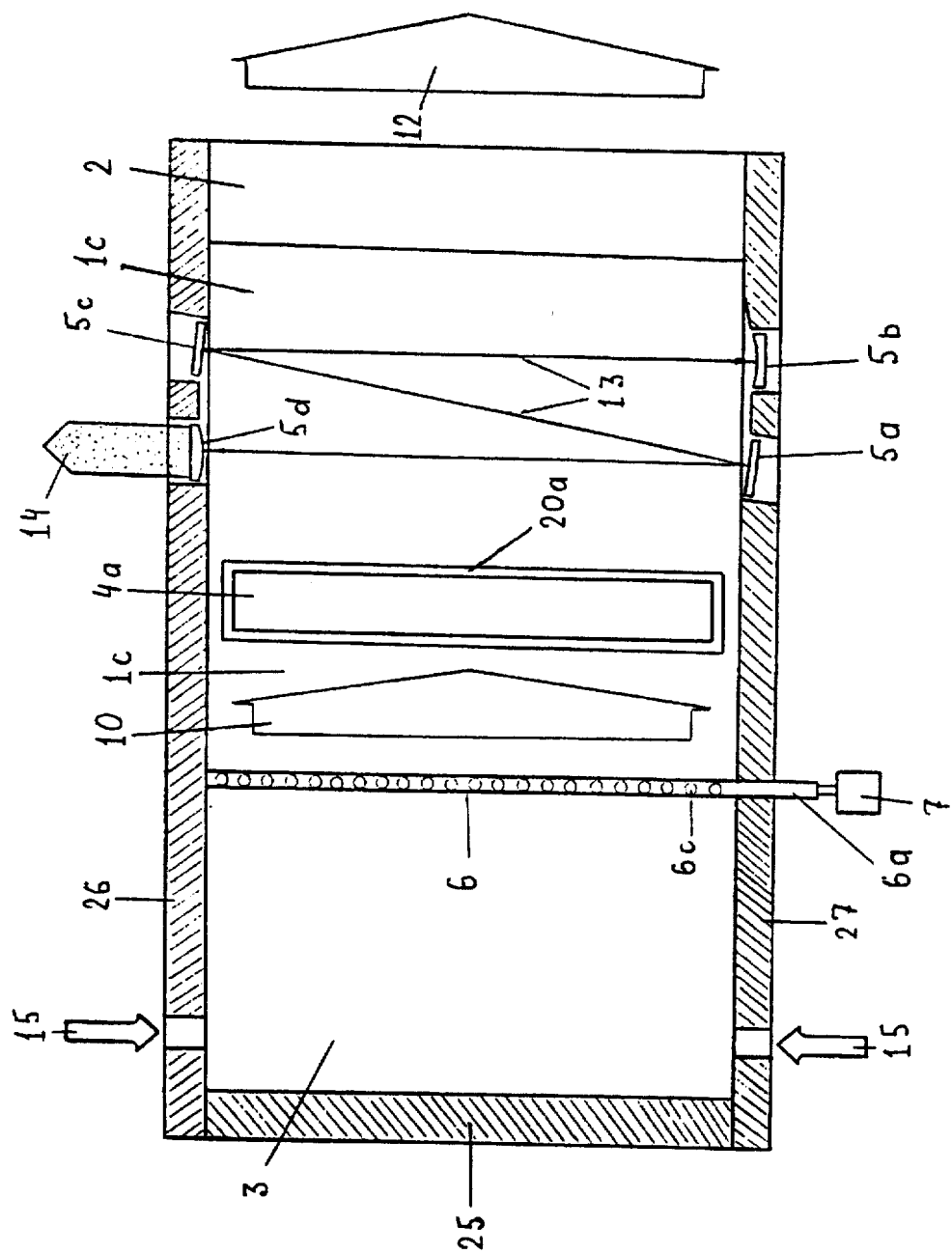

SUPERSONIC AND SUBSONIC LASER WITH HIGH FREQUENCY DISCHARGE EXCITATION

BACKGROUND OF THE INVENTION

1. Field of the Invention

The present invention relates to supersonic and subsonic lasers which have a gaseous active medium, a nozzle, a discharge region, a laser active region, an optical resonator and a diffuser. The laser of the present invention uses high frequency discharge excitation to generate a non-equilibrium plasma in the area of the sonic or supersonic/subsonic gas flow. The high frequency discharge excitation may occur within the critical area of the supersonic nozzle or downstream from the critical area, within the nozzle and may be enhanced by electrical or ultraviolet pre-ionization of the gaseous active medium in the pre-critical or critical area of the supersonic nozzle.

2. Discussion of the Prior Art

Known gas laser systems use an electrical discharge between DC electrodes within transfer or axial flows. However, utilization of DC or standard AC electrodes, within fast subsonic and especially supersonic flows, creates unstable and non-uniform (in time and space) plasma discharges. These non-uniform discharges produce aerodynamic instability of the gas flow. This instability, characterized by wave shocks and turbulence, is proportional to the static pressure of the flow and volume of the discharge region between DC or AC electrodes. These limitations prevent creation of a stable, uniform and continuous excitation plasma.

The aerodynamic instability of the supersonic and subsonic flow generated in the known gas lasers produce regions of increased temperature, related to the wave shocks, as well as temperature pulsations, related to the turbulence. These factors are responsible for reduction of the laser inversion population, efficiency of the laser and optical quality of the flow within the resonator region.

Gas medium excitation, utilizing glow DC discharge, is also well known. This laser design, however, has fundamental problems. Utilization of glow DC discharge in the excitation region creates a very high concentration of the electrical energy in a very small contained area. An extremely high plasma temperature, associated with typical glow DC discharge excitation, produces a high degree of thermal dissociation of molecules. The chemical reaction of thermal dissociation is exemplified in glow DC discharge using $CO_2$ causing disintegration of $CO_2$ molecules to molecules of CO and atoms of O. As a result, the active medium of $CO_2$ laser loses their molecular oscillators. Additionally, the high plasma temperature causes an equilibrium plasma in the active medium which prevents the creation of inversion population in the discharge region, a fundamental requirement for generating lasing activity.

SUMMARY OF THE INVENTION

The present invention is for a supersonic or subsonic laser having a high frequency discharge excitation and utilizing a gaseous flow of active medium. The laser consists of a gas supply line which provides the gaseous medium into a receiver area. The gas may be supplied into the laser at a predefined pressure, depending upon the specific type of gas utilized. The gas passes through the supply line and receiver at slow subsonic speeds.

Downstream of the receiver area is located a supersonic nozzle which opens into an optical resonator region and which also contains a localized excitation area. Downstream of the optical resonator region is located a diffuser, which causes the deceleration of the supersonic or subsonic gas medium flow across the entire transverse cross-section of the supersonic nozzle. The laser of the present invention has a two-dimensional nozzle interior.

The laser device of the present invention provides for a high output power of laser generation and highly efficient use of the gaseous active medium in order to generate an extremely efficient laser while utilizing a simplistic design and relatively low energy supply. The laser can use various gases or mixtures of gases in combination with high frequency discharge excitation between RF linear electrodes in the area of sonic or supersonic/subsonic flow of the gas active medium. The laser of the present invention utilizes a high frequency discharge which creates a non-equilibrium plasma through ionization and electron excitation of high states of atoms, molecules or ions in order to achieve a high inversion population necessary to generate lasing activity in the optical resonator region.

The laser of the present invention has a high frequency discharge region between linear RF electrodes in the area of the sonic (M=1) or supersonic/subsonic (M>1/M<1) flow of the gaseous active medium. The flow of the active medium is uniformly penetrated by RF radiation between linear electrodes. The high frequency discharge region is located between RF electrodes and can be located within the critical area (sonic area) of the supersonic nozzle or downstream of the critical area within the supersonic area of the nozzle. The excitation region of the laser may have a more extensive area relative to the discharge region, depending upon the active medium or the pressure of the gas and may occur within the critical and supersonic areas of the nozzle up to the beginning of the optical resonator area. Alternatively, the location of RF electrodes and discharge region can be coextensive with the optical resonator region.

Within the optical resonator region is located the laser active region. This region is transversed by the resonator beam phases thereby taking advantage of the maximum level of laser invercy (inversion population) present and generating resonance photon amplification. The lasers generated by high frequency discharge excitation of the present invention are within the wavelength range of from 0.3 mkm to 10.6 mkm.

Additionally, pre-ionization of the gaseous medium may take place in the pre-nozzle receiver area or within the critical area of the nozzle in order to aid in the creation of high frequency plasma required for ionization and electron excitation of the gaseous active medium in the excitation region. Such pre-ionization may be generated by a pre-ionization low voltage DC or AC grid through which the gaseous medium passes. The DC or AC grid has two electrodes with columns of metal pins extending therefrom through which the gaseous medium passes. Alternatively, pre-ionization may be generated using Ultraviolet bulbs or other UV sources. The pre-ionization of the gaseous medium may be further enhanced by adding some portion of light ionization gas or vapor to the gaseous active medium.

Located downstream and at the end of the receiver area is a supersonic nozzle. The two-dimensional supersonic nozzle has an optimal logarithmic profile to insure a quiet supersonic/subsonic flow having a uniform transverse distribution of thermodynamic parameters and allowing for the adiabatic expansion of the gases within the nozzle. The supersonic nozzle opens into and within the optical resonator region and has a small opening angle to insure parallel supersonic/subsonic flow within the supersonic area of the nozzle. The supersonic area of the nozzle occurs in the interval between the critical section of the nozzle and the downstream diffuser.

Finally, the present invention comprises a high frequency discharge laser comprising: a receiver having a gas inlet; a gas medium; a pre-ionizer downstream of said receiver; a supersonic nozzle downstream of said receiver; at least one pair of high frequency discharge electrodes; an optical resonator within said nozzle penetrated by a laser beam; and, a diffuser located downstream of said optical resonator.

BRIEF DESCRIPTION OF THE DRAWINGS

A better understanding of the invention will be had upon reference to the following description in conjunction with the accompanying drawings in which like numerals refer to like parts and wherein:

FIG. 3B is a sectional view of the laser body of FIG. 3A taken along lines 3B;

FIG. 3C is a sectional view of the central portion of the laser of FIG. 3A taken along lines 3C—3C;

DETAILED DESCRIPTION OF THE PREFERRED EMBODIMENT

Figure 1A:
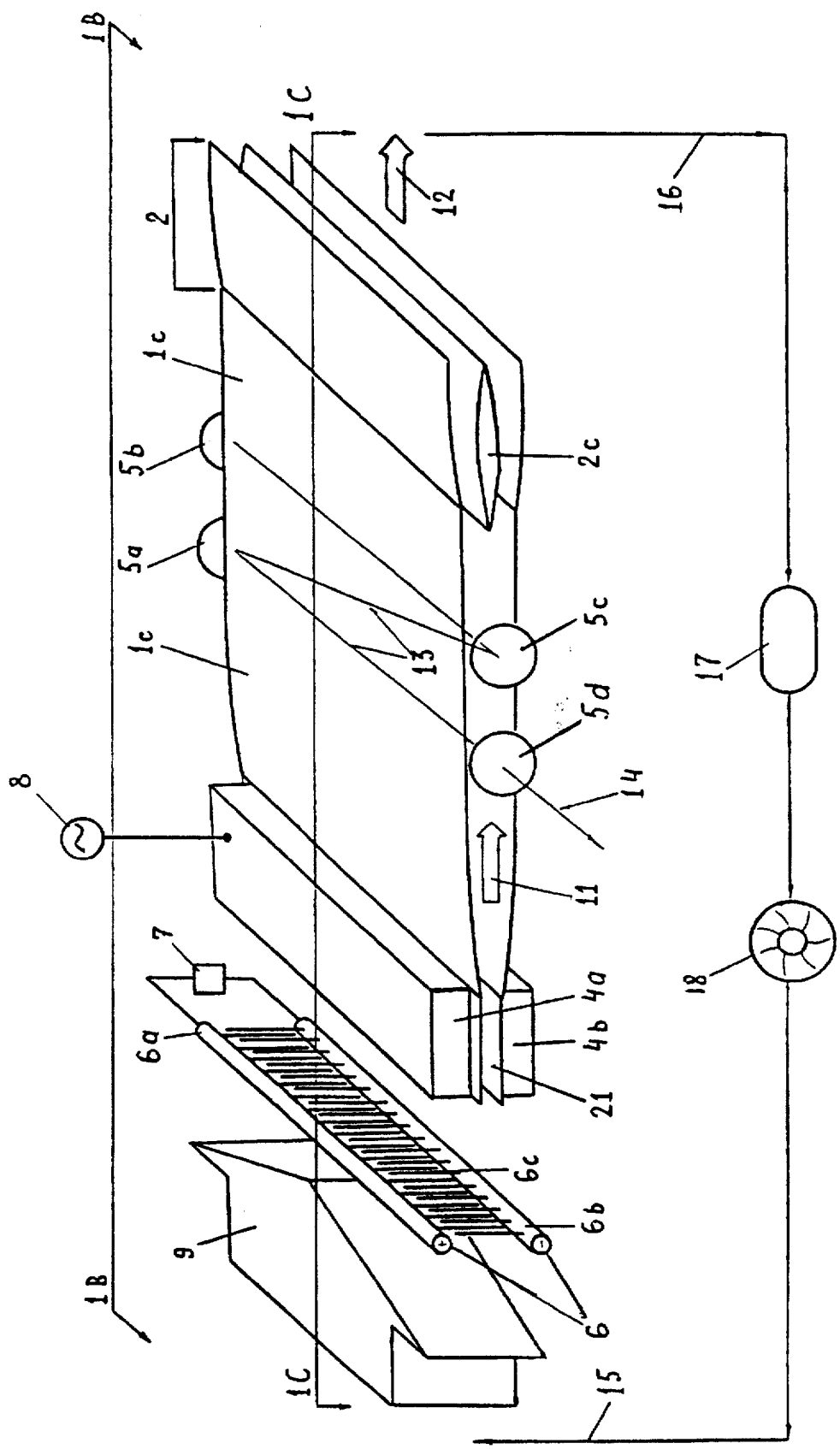
FIG. 1A is a perspective view of a laser of the present invention having a pre-ionization grid in the end of the receiver area and having high frequency discharge excitation in the critical area of the nozzle.
Figure 1B:
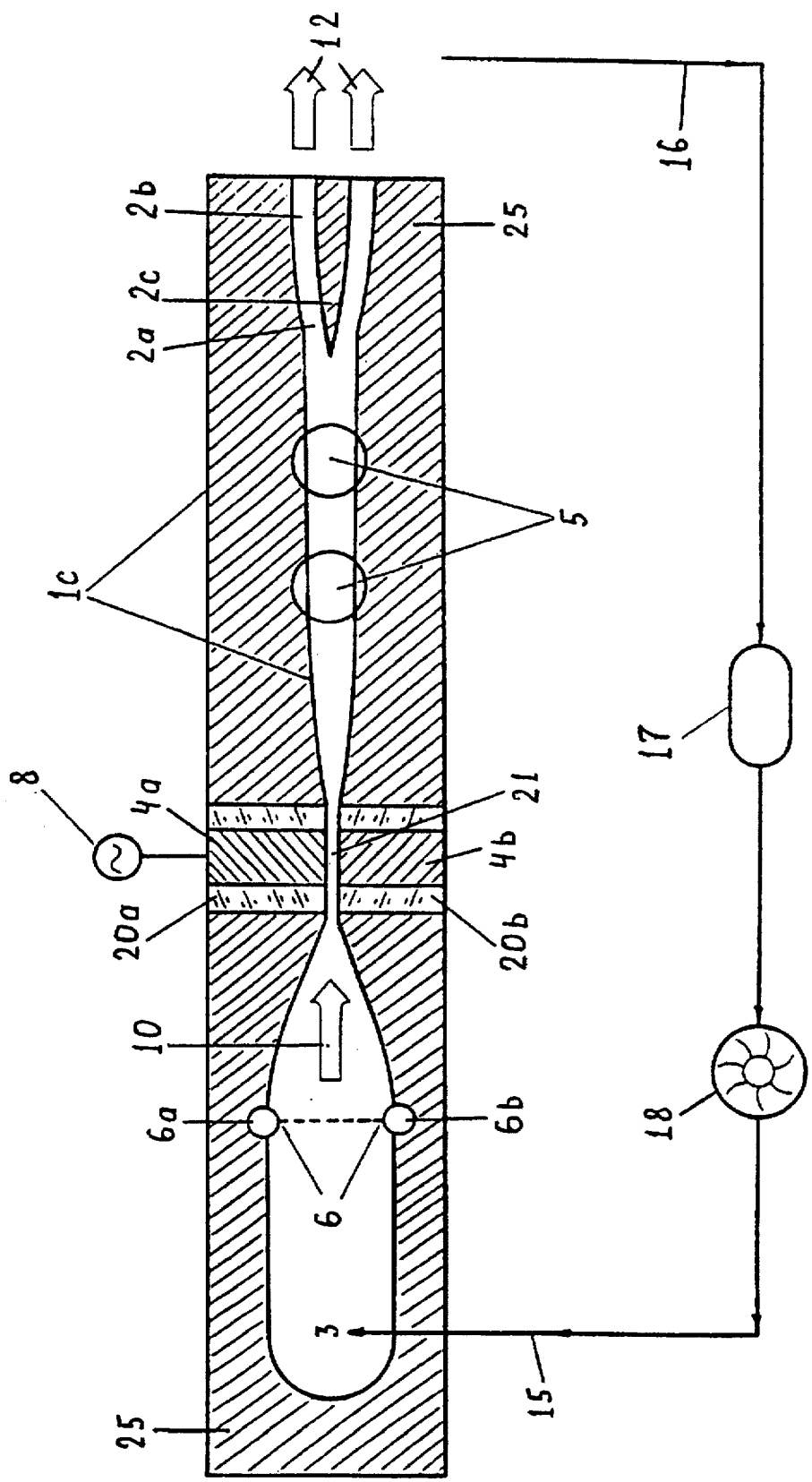
FIG. 1B is a sectional side view of the laser body of FIG. 1A taken along lines 1B—1B.
Figure 1C:
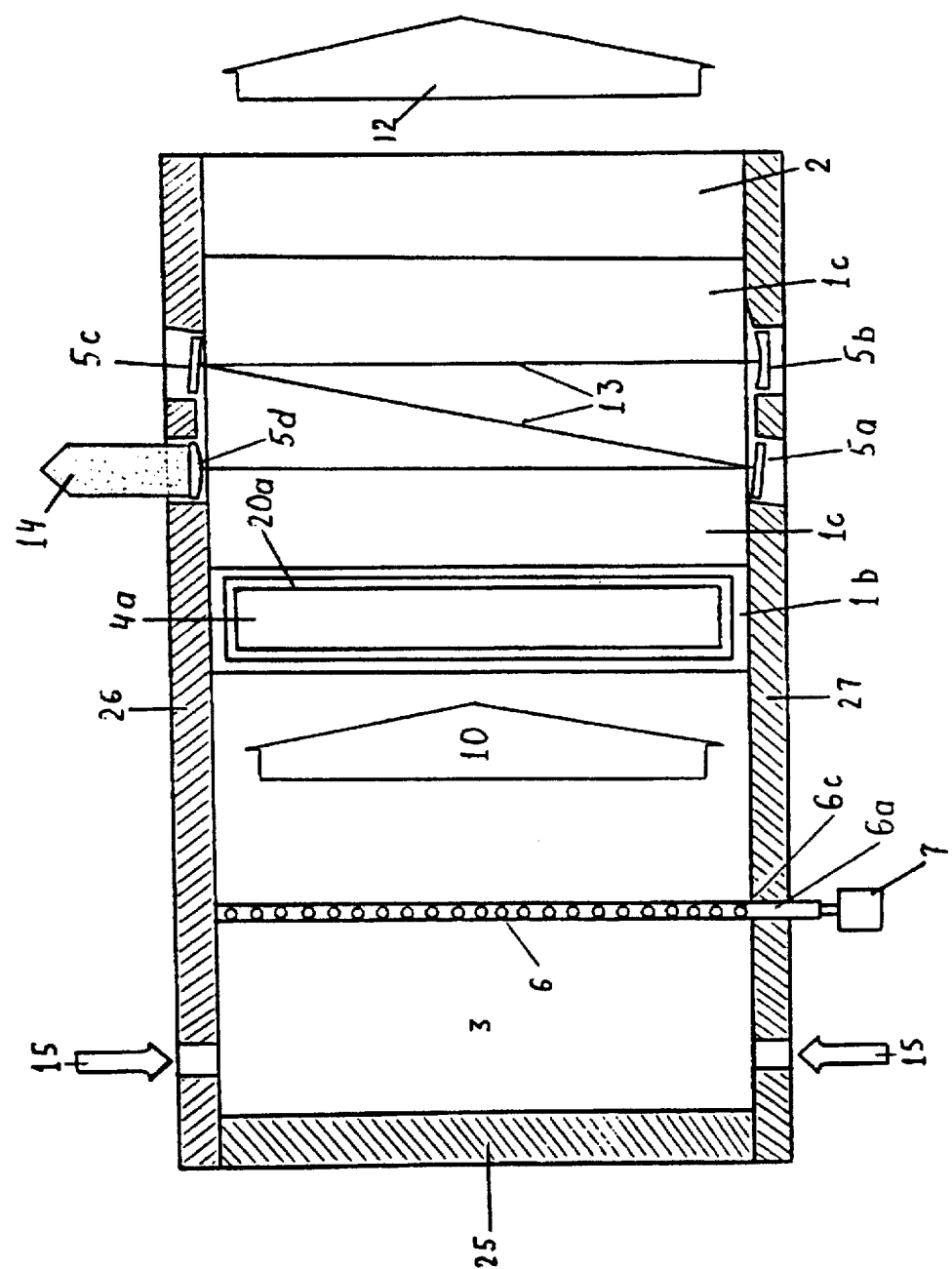
FIG. 1C is a sectional view of the central portion of the laser of FIG. 1A taken along lines 1C—1C.

Referring now to FIGS. 1B and 1C, the body of the laser device of the present invention is comprised of a center body member 25 and two single piece side plates 26 and 27, which are hermetically sealed (using an "O" ring elastomeric seal such as Silicon or Viton gaskets) and which define an interior laser body and gaseous laser medium path. The center body member 25 and side plates 26, 27 define the aerodynamic space within which the gas circulates. The gas chamber region of the embodiment of the laser shown in FIG. 1A is better shown in FIG. 5 which shows: a receiver area 3; a pre-ionization grid 6; an upper and lower high frequency electrode 4a and 4b, respectively; discharge region 21 coinciding with the critical area 1b of the supersonic nozzle 1; an excitation region 22 where the inversion population grows; an optical resonator region 23; resonator mirrors 5; and, a laser active region 24 where the inversion population is maximized and a diffuser 2.

As shown in FIGS. 1A, 2A, 3A and 4A, the active gas medium is introduced into the system by a gas pump 18 which receives cooled gas from a cooling system 17, pump 18 drives the gas under a predetermined pressure into the receiver area 3. The predetermined pressure at which the gas is supplied is determined by the gas medium. Typically, gas is supplied at atmospheric pressure. The gas circulates from the point of introduction into the laser body at the receiver 3 downstream through the nozzle 1 in FIG. 5, and through the diffuser 2. The gas which passes through the system may be recirculated, as is shown in FIGS. 1A, 2A, 3A and 4A, or may be newly introduced into the laser body at the receiver area 3 from a gas reservoir or tank (not shown).

The central laser body 25 and dual side plates 26 and 27 are comprised of an aluminum or aluminum alloy having all aerodynamic interior surface of non-conductive skin with a thickness of around 0.0025 inches or more. The interior non-conductive skin layered on the aluminum surface may be comprised of $AlO_3$ which can be created by hard coat anodizing or by hard coat anodizing with TEFLON impregnation for better smoothness. The interior non-conductive skin also can be created by plating of low phosphorous nickel directly to the surface of the aluminum block. The laser body can also be manufactured from a dielectric material like TEFLON or solid silicon or other hard dielectrical material which exhibits a high temperature of vaporization like a ceramic. A ceramic can form the laser body interior by using the well known method of plasma spray applied directly to a plastic or aluminum mold and an additional dissolving of the mold from within the laser interior.

The laser of the present invention can use the following gaseous active mediums:

a: $CO_2$: $N_2$: He b: Carbon Monoxide (CO) with or without some portion of Oxygen ($O_2$);

C: Argon (Ar) with or without some portion of Helium (He);

d: Krypton (Kr) with or without some portion of Helium (He);

e: Helium and Neon (He: Ne).

Each of these gaseous mediums can be combined with a small portion of gas having a low potential ionization such as: Xenon (Xn) or vapor from Cesium (Cs) or liquid Dimethilaniline $(CH_3)_2C_6H_3NH_2$. This pre-ionization gas or pre-ionization vapor combined with the main gaseous medium aids in the pre-ionization of the gaseous medium before high frequency excitation stimulates ignition of the non-equilibrium plasma.

For gaseous mediums "a" and "b", the high frequency discharge laser of the present invention uses the molecular transitions based upon ionization and electron excitation of the high vibrational and rotational states of molecules. In this case, the high frequency discharge laser is molecular and produces laser infrared radiation, on the vibration transitions, with wavelengths of from about 9.6 mkm to about 10.6 mkm for "a" and around 5 mkm for "b". For active mediums "c" and "d", the high frequency discharge laser uses the transitions between energy states of ions. When so used, the laser is ionic and generates visible laser radiation having a few spectral lines of from about 0.45 mkm to about 0.5 mkm wavelengths for medium "c", and about 0.6 mkm for medium "d". For active medium "e", the high frequency discharge laser uses atomic transitions with generation of visible laser emission having a wavelength of around 0.63 mkm.

One embodiment of the supersonic/subsonic laser with high frequency discharge excitation is shown in FIG. 1A. In this embodiment, pressurized gas 9 flows from a source or return line 15 and is forced into the receiver area 3 under increased pressure from gas pump 18 through gas supply line 15. The inlet to the receiver 3 is therefore in flow communication with the gas via pump 18 and supply line 15. The range of static pressure of the gas within the receiver area is generally from 0.1 bar to 1 bar.

The pressure of the gas in the receiver area 3 is dependant upon the type of gaseous active medium used and also upon the gas consumption caused by the lasing activity. This also depends upon output power of the laser emission and power of RF excitation.

Referring now to FIG. 1B located downstream of the receiver area 3 and prior to the supersonic nozzle 1b is a pre-ionization grid 6. Alternatively, pre-ionization may be effected by using an ultraviolet source, such as a pair of UV bulbs and the like. Utilizing pre-ionization before or within the high frequency discharge region enhances the ignition of the excitation plasma and the utilization of costly high frequency energy within the system. By pre-ionization of the active medium using either a DC or an AC grid or UV bulbs, uniform excitation of the non-equilibrium plasma between RF electrodes 4a and 4b found in the high frequency discharge region 21 is accomplished.

Figure 6:
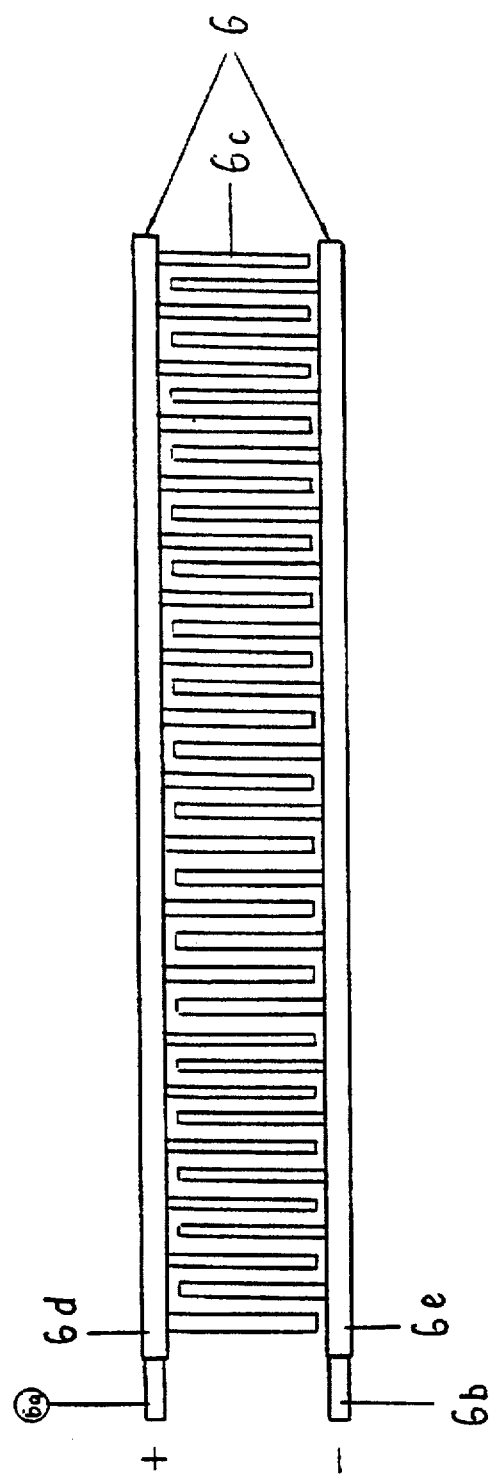
FIG. 6 is a frontal view of the pre-ionization grid of FIG. 1A.

The pre-ionization grid 6, shown in FIG. 6, has metal pins extending downward from a positive electrode 6a and upward from a negative electrode 6b. The pins extending downward and upward from respective electrodes are substantially coextensive and spaced apart from one another a predetermined distance. By coextensive, it is meant the downward and upward extending pins are adjacent to one another. The grid may be energized by either an AC or DC power supply 7 connected to said electrodes 6a and 6b. The gap between pins 6c extending downward from electrode 6a and upward from electrode 6b should be minimal so as to allow for the use of a minimum voltage required to ionize the gaseous medium, preferably about 0.04 inch. This small gap between pins 6c enables ionization of the gaseous medium using a compact and less costly low voltage power supply, as compared to high frequency power generation. The electrodes 6a and 6b are preferably comprised of aluminum or brass. The pins 6c are generally comprised of brass plated with silver for better conductivity. The lower and upper dielectric tubes 6d and 6e are used to insulate the electrodes 6a and 6b from the metal laser body 25 and may be comprised of either TEFLON or solid silicon or another dielectric material with good insulation characteristics and a high temperature of vaporization.

Figure 2A:
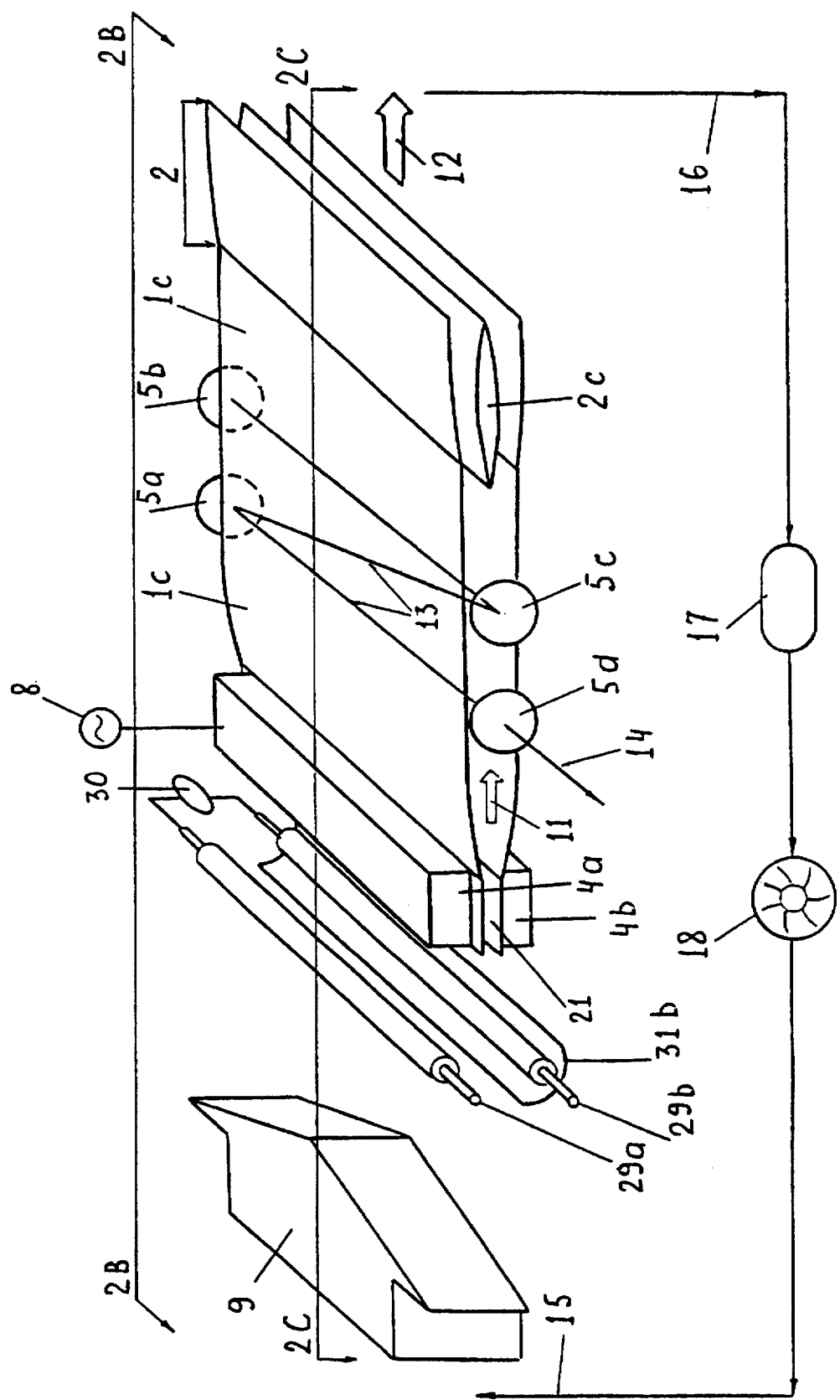
FIG. 2A is a perspective view of a laser of the present invention having a pre-ionization UV bulbs in the end of receiver area and having high frequency discharge excitation in the critical area of the nozzle.

As shown in FIG. 2A, pre-ionization of the gaseous medium may be accomplished by a pair of UV bulbs 29a and 29b and power supply 30. The gas flow 9 from the gas supply line 15 enters the receiver 3. The gas, contained at a predetermined pressure via pump 18, passes between upper UV bulb 29a and lower UV bulb 29b before entering into the excitation region of the high frequency discharge area between upper and lower linear RF electrodes 4a and 4b respectively. UV photo-ionization in the laser of FIG. 2A is located before the critical area 1b of the supersonic nozzle 1, shown in FIG. 5. Pre-ionization generated by DC or AC grid or by the UV bulbs helps to ignite and uniformly excite a non-equilibrium plasma between downstream RF electrodes.

Referring again to FIG. 1A, there is shown a predetermined distance between the pre-ionization grid 6 and the upper and lower RF linear electrodes 4a and 4b which are located in the critical area 1b of the supersonic nozzle 1. This distance between the pre-ionization grid 6 and the high frequency discharge excitation region 22 should be kept as minimal as possible so that the ionized gas may be acted upon by the high frequency discharge of the RF linear electrodes. Therefore, the maximum distance between the grid 6 and discharge region 21 should be the time life of the ionization multiplied by the speed of the gas flow in the interval between the pre-ionization grid 6 and the RF electrodes 4a and 4b.

Alternatively, the UV bulbs of circle or square configuration may be placed within side plates 26 and 27 in the critical area 1b of the nozzle 1. In this case the region of UV photo-ionization and the region of high frequency discharge excitation will be combined in the discharge region 21.

Figure 2B:
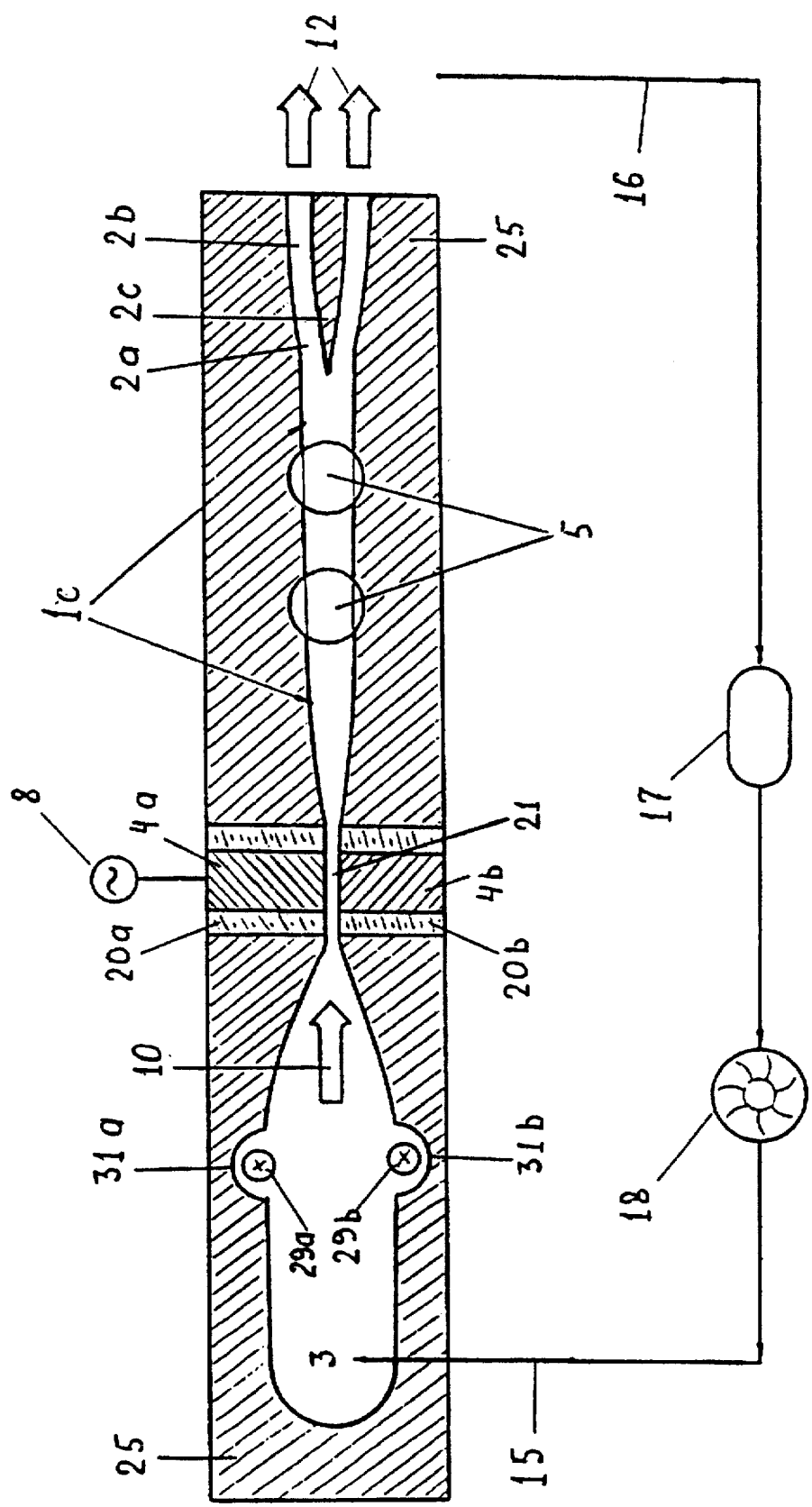
FIG. 2B is a sectional view of the laser body of FIG. 2A taken along line 2B—2B.
Figure 5:
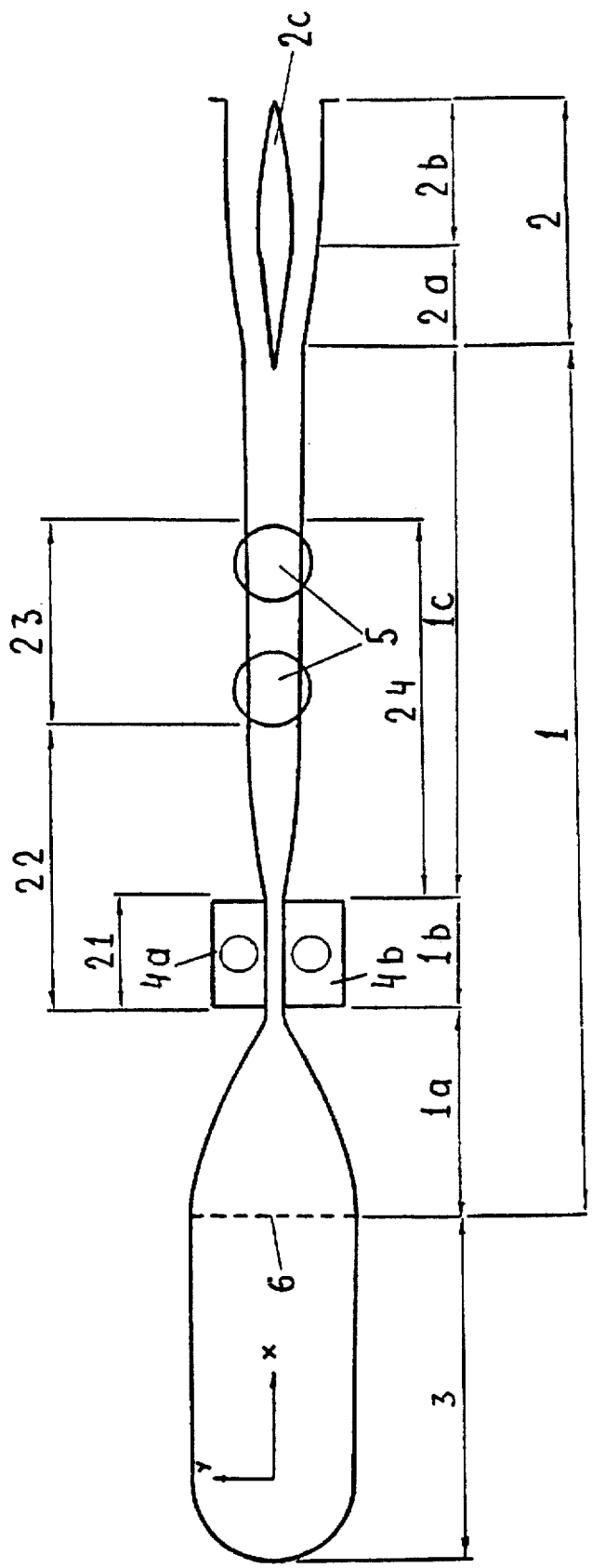
FIG. 5 is a full side view of the inside laser interior and active gas medium path.

As shown in FIG. 1B and 2B, downstream of the receiver area 3 is the high frequency discharge region 21 located within the critical area 1b of the supersonic nozzle, said critical area better displayed in FIG. 5. The high frequency discharge region 21 is created between two linear RF electrodes 4a and 4b. The non-equilibrium plasma, created by RF radiation between linear electrodes 4a and 4b, occupies the area of the sonic pre-ionized gas flow, in this particular embodiment, in the critical area 1b of the supersonic nozzle 1 of FIG. 5.

Figure 2C:
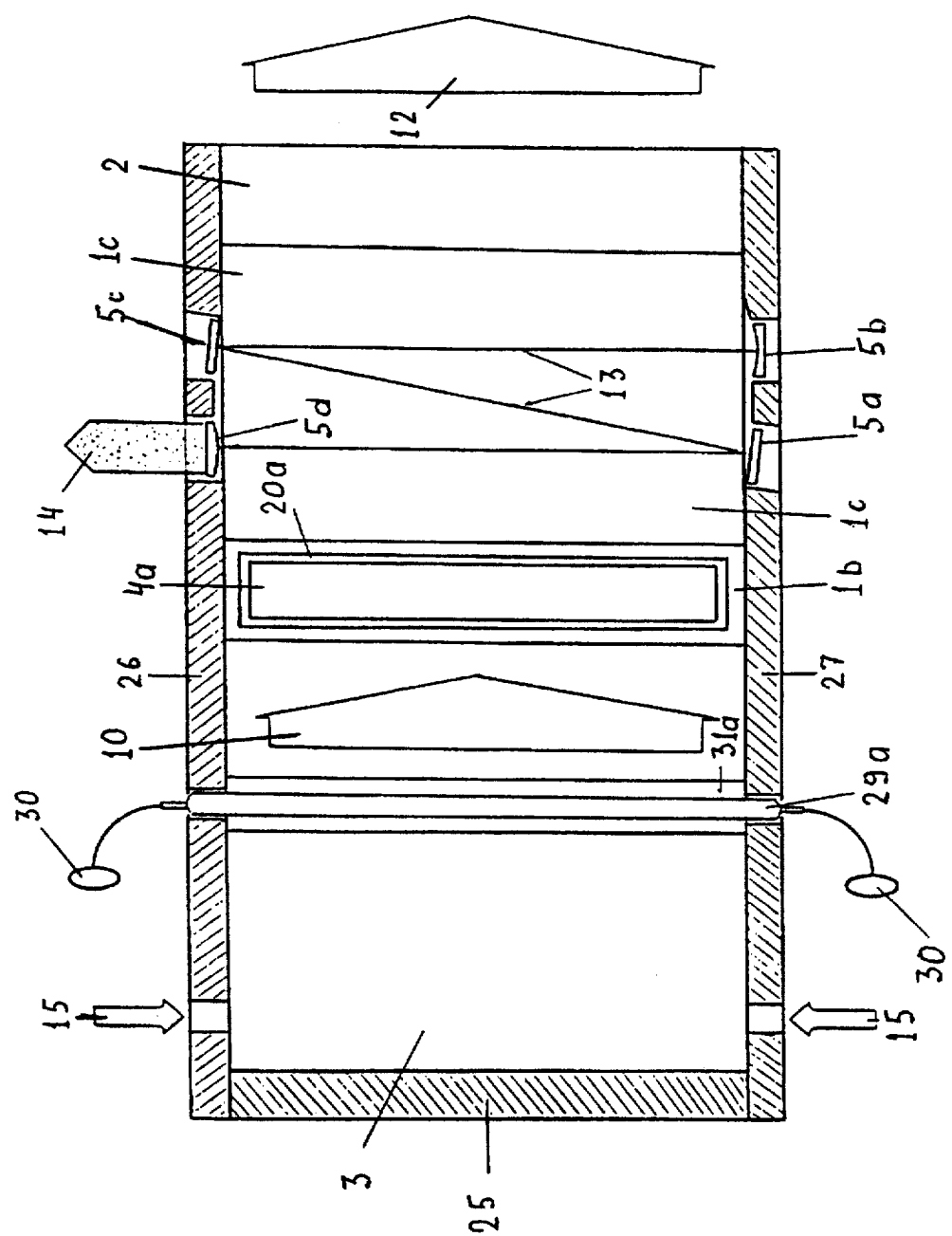
FIG. 2C is a sectional view of the central portion of the laser of FIG. 2A taken along lines 2C—2C.

The excitation region, in FIG. 5, which includes the discharge region 21 and some distance downstream of the discharge region, is the area identified by reference numeral 22 where the inversion population grows. This area is located immediately preceding the optical resonator region 23 within which the optical resonator mirrors 5a, 5b, 5c and 5d shown in of FIGS. 1C and 2C, are located. The entire region defined as a portion of supersonic nozzle 1 including a portion of the excitation region 22 and all of the optical resonator region 23 is the laser active region 24. This region 24 is the area where the static temperature of the supersonic flow reaches its minimum level and where maximum photon amplification on resonance transitions takes place. The inversion population required for creation of laser energy reaches a maximum level within the laser active region 24, particularly if the RF electrodes are located within the critical area of the supersonic nozzle, as shown in FIGS. 1A, 2A.

Located downstream of the pre-ionization grid 6 at the end of the receiver area is the two-dimensional supersonic nozzle 1 of FIG. 5. By two-dimensional, it is meant that the profile of the supersonic nozzle 1 depends upon two axis X and Y (also called a flat nozzle). This narrowing of the y axis to create the critical portion of the nozzle causes the adiabatic expansion of the gas flowing therethrough.

The nozzle 1 is comprised of three parts: subsonic area 1a, critical (sonic) area 1b and supersonic area 1c. The nozzle 1 is designed to have a minimum length along the gas flow X axis and smooth optimal aerodynamic form to insure a uniform quiet supersonic or subsonic flow within the optical resonator region. The supersonic area of the nozzle has an optimal logarithmic profile beginning at the critical area of the nozzle and opening into and within the optical resonator region 23. The range of speed of the gas flow in the supersonic area of the nozzle within the resonator region is from subsonic speed 0.5M to supersonic 5M, (M equals speed of sound) depending upon the active medium used and gradient of static pressure of the gas between subsonic area 1a and supersonic area 1c of the nozzle. The height of the critical section 1b of the nozzle, or distance between RF electrodes, may have a range between 0.04 and 0.4 inch. The typical height of the critical area is about 0.157 inch, in the embodiment of FIG. 1A and about 0.04 to 0.1 inches for the short critical area shown in FIGS. 3 and 4. The cross-sectional width of the critical section 1b or receiver 3 may have a range between 1 and 20 inches. The typical width is about 10 inches. The length of the critical area 1b of the nozzle, along the gas flow X axis, depends upon the length of RF electrodes 4a and 4b placed in the critical region. The typical length is about 1 inch.

The supersonic logarithmic profile of the nozzle 1c, beginning at the critical area 1b and extending up to the front of diffuser 2 has a small expanding angle of about 0.5 degrees within the optical resonator region 23, as shown in FIG. 5. The small opening angle formed by the logarithmic profiles of the walls of the nozzle is necessary to compensate for the growing thickness of the boundary viscosity skins on the walls and to ensure a quiet and parallel supersonic or subsonic flow between the critical area of the nozzle 1b and the downstream diffuser 2. The opening angle depends on the speed of the gas medium in the supersonic area 1c, the static pressure of the gas flow, and its temperature. The pre-ionized laser gas flow 10 and the post-HFD excited gas flow 11 passing through the critical area of the nozzle and downstream into the optical resonator region 23 where the mirrors 5 are located is a quiet supersonic or subsonic flow substantially free from wave shocks. The gas flow in the resonator region 23 has a uniform transverse distribution of thermodynamic parameters, such as static pressure and gas flow speed across its height and width.

The critical area of nozzle 1b causes the intensive adiabatic expansion of the gaseous active medium resulting in an extremely low static gas temperature within the supersonic area 1c and reduces population of the lower energy states of atoms, molecules or ions of said medium. The range of the static gas temperatures in the supersonic flow within the supersonic area 1c depends on the speed of gas flow (between Mach 0.5M to 5M ) and is typically between 50 to 285 Kelvin. For a typical supersonic flow exhibiting a speed of Mach=2, the static temperature is 165 Kelvin. This low static temperature of the supersonic flow reduces population of the lower energy states of molecules, atoms or ions and creates an increasing laser invercy, coefficient of amplifier of the active medium, output power and overall efficiency of the laser and also aids in the full utilization of non-equilibrium plasma created by high frequency discharge excitation. Creation of extremely low atomic temperatures resulting from the dynamic cooling of the gas flow within the supersonic nozzle 1 enables the laser to produce maximum possible laser energy and efficiency of the laser system. For a $CO_2$ laser, this may reach an efficiency level of up to 20–30%. The efficiency may reach 20% for a CO laser and 10% for Ionic Argon II laser. The output power of the present laser may reach the multi-kilowatts range for said active mediums and may be further increased up to a maximum level which is limited by the maximum possible internal resonator intensity of the laser emission, the time of generation, the size of the laser active region and the heating of the resonator mirrors.

Additionally, the optimal aerodynamic form of the present laser interior produces quasi-laminar supersonic or subsonic flow within the resonator region when the number of Reynolds (gas dimensionless parameter) is below the critical level Re<100000. This "smooth" quasi-laminar flow, free from wave shocks and turbulence, produces a high optical quality, as well as the optical quality of the output laser beam.

Figure 7:
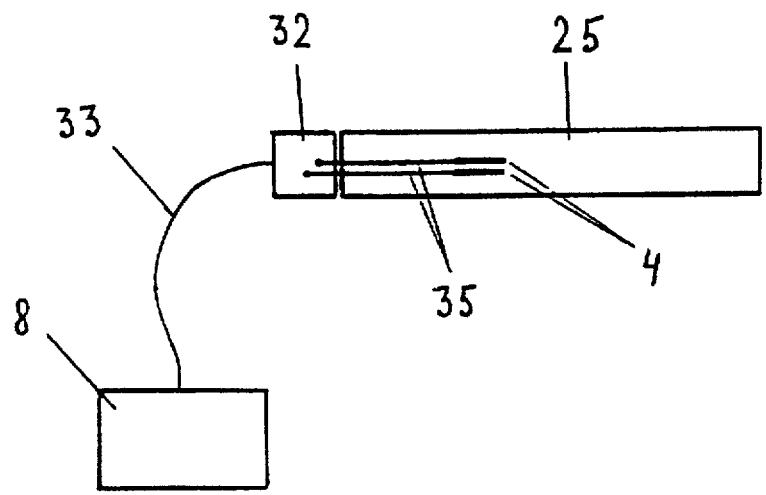
FIG. 7 is a diagram of the electrical connections of the electrodes for the laser of FIG. 1A, 2A, 3A and 4A, wherein the RF resonator is integrated with the high frequency discharge electrodes, said resonator connected to an RF power supply; and, FIG. 8 is a diagram of an alternative RF power supply connection wherein the electrodes of the laser of FIG. 1A, 2A, 3A and 4A are integrated with an RF Power Amplifier and RF Resonator, said resonator electrically connected to a DC power supply and controller.

Within the critical section of the supersonic nozzle are located upper and lower linear RF electrodes 4a and 4b for generating a high frequency discharge for ionization and electron excitation of the pre-ionized gas flow 10. The electromagnetic RF field generated in the high frequency discharge region 21 is produced by linear electrodes 4a and 4b, which are connected to two coils 32a and 32b which act as an RF resonator and is shown in FIG. 7. A high frequency generator 8 supplies RF energy to the linear electrodes 4a and 4b for creating a high frequency plasma in the discharge region 21 in order to further excite the pre-ionized gaseous laser medium 10 and populate the higher energy states of molecules, atoms and ions. This high energy state population creates the proper laser invercy necessary for lasing activity. The RF linear electrodes 4a and 4b are comprised of an aluminum or aluminum alloy having non-conductive skin created by hard coat anodizing $AlO_3$ with a typical thickness of about 0.0025 inches or more. The metal RF electrodes 4a and 4b are distilled water cooled.

Two dielectric windows 20a and 20b cover the perimeters of the upper and lower RF metal electrodes in order to insulate them from the metal laser body. The thickness of the dielectric walls should be greater than the gap between the electrodes 4a and 4b (height of the critical area of the nozzle). This factor is very important in order to provide the maximum possible RF energy through the discharge region between electrodes but not to the metal laser body. The typical thickness of the dielectric walls around RF electrodes should be at least 1.5–2 times wider than the height of the critical gap (gap between RF electrodes). The aluminum RF electrodes have hard coat anodizing skin or low phosphorous Nickel skin or ceramic skin, which is non-conductive. The dielectric panels cover the electrodes only along their side perimeters, as shown in FIGS. 1B, 2B, and 3B, or all surfaces including the sides facing the discharge region as shown in FIG. 4B.

The dielectric windows 20a and 20b, for the upper and lower RF electrodes 4a and 4b, can be manufactured of TEFLON or ceramic (either Aluminum Oxide $Al_2O_3$ or Beryllium Oxide $Be_2O_3$). The ceramic walls can be applied by the well known method of plasma spray directly to the metal surface of the electrode combined with additional machining of the ceramic surfaces to the dimensions required for the windows in the laser body. The use of ceramic is necessary due to the possibility of a relatively high plasma temperature in the discharge region 21.

Additionally, the RF electrodes 4a and 4b do not extend all the way to the side walls 26 and 27 of the critical area 1b of the supersonic nozzle, as best shown in FIGS. 1C and 2C.

The interval between the end of the linear electrodes 4a and 4b and the side wall 26 and 27 of the critical area of the nozzle 1b, about 0.6 inches, allows for a cool buffer flow along laser side walls of the gaseous medium free from the plasma effect. This cool buffer flow also extends downstream on both sides of the supersonic cavity 1c to the resonator mirrors 5 thereby preventing the mirrors 5 from being damaged by the high energy plasma resident in the central area of the gas flow. The mirrors 5 present in the resonator 23 are thereby cooled by the cool buffer flow of gas which is free from the plasma effect and not acted upon by the upstream electrodes 4a and 4b. The electrodes 4a and 4b do not therefor extend the full cross-sectional width of the nozzle 1 thereby leaving a portion of the gas free from the plasma effect and creating said cool buffer flow.

The upper and lower linear electrodes 4a and 4b are oriented perpendicular to the flow 10 of the pre-ionized gaseous medium and are supplied with energy from the high frequency generator 8. The electrodes 4a and 4b create a high frequency plasma for the excitation of the laser gas within the excitation region 22 as shown in FIG. 5.

FIG. 7 shows a diagram of the laser RF electrodes 4 integrated with an RF resonator 32. There is also shown these sections attached to the RF Power Supply 8 required for generation of high frequency discharge. The connection between the RF Power Supply 8 and the RF Resonator 32 is completed by an RF Cable 33 which is comprised of a TEFLON coaxial cable. Both the upper and lower electrodes 4 have a perpendicular orientation relative to the flow 10 and are connected to the RF resonator via electrical connection 35.

Figure 8:
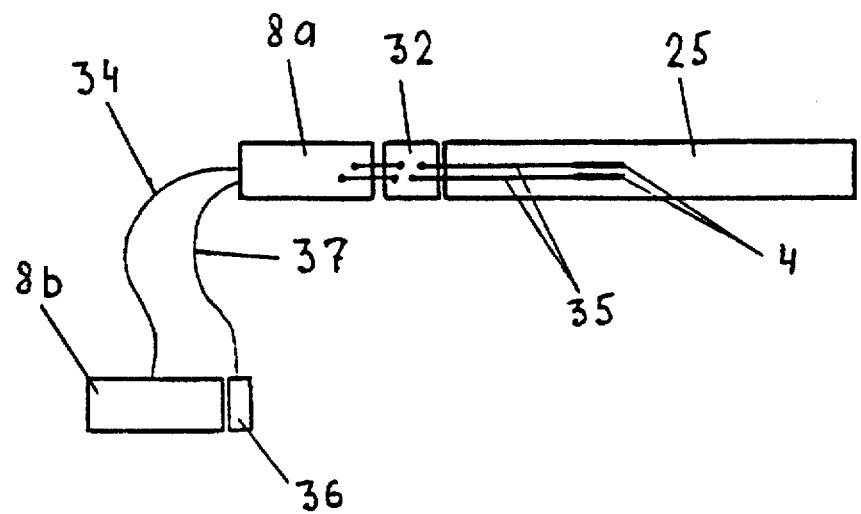

FIG. 8 represents a diagram of the laser electrodes 4 with an alternative RF power supply 8a and 8b wherein the laser head 25 is integrated with an RF Resonator 32 and RF Power Amplifier 8a. The integration of the resonator and power amplifier in one unit prevents the requirement, shown in FIG. 7 as element 33, of a thick high power coaxial connection between the power supply and resonator. In this embodiment, a DC coaxial cable 34 attaches the power supply Section 8b to the RF power amplifier 8a. Power supply section 8b containing the DC power supply, also has the control circuitry 36. The control circuitry 36 is connected to the RF Power Amplifier 8a via low voltage DC coaxial cable 37.

Figure 3A:
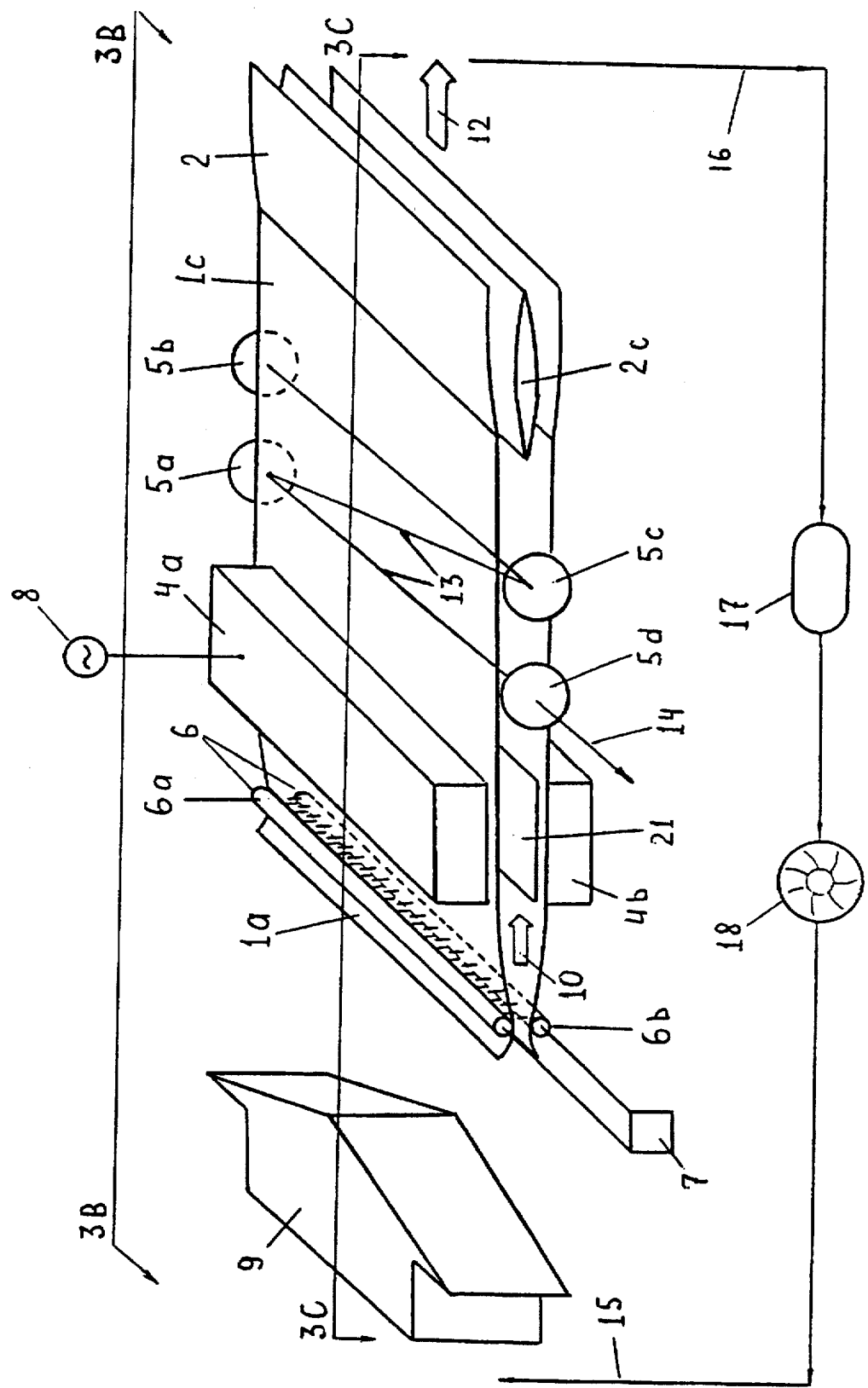
FIG. 3A is a perspective view of a laser of the present invention having a pre-ionization grid in the critical area of the nozzle and having a high frequency discharge excitation after the critical section within the nozzle and prior the optical resonator region.
Figure 4A:
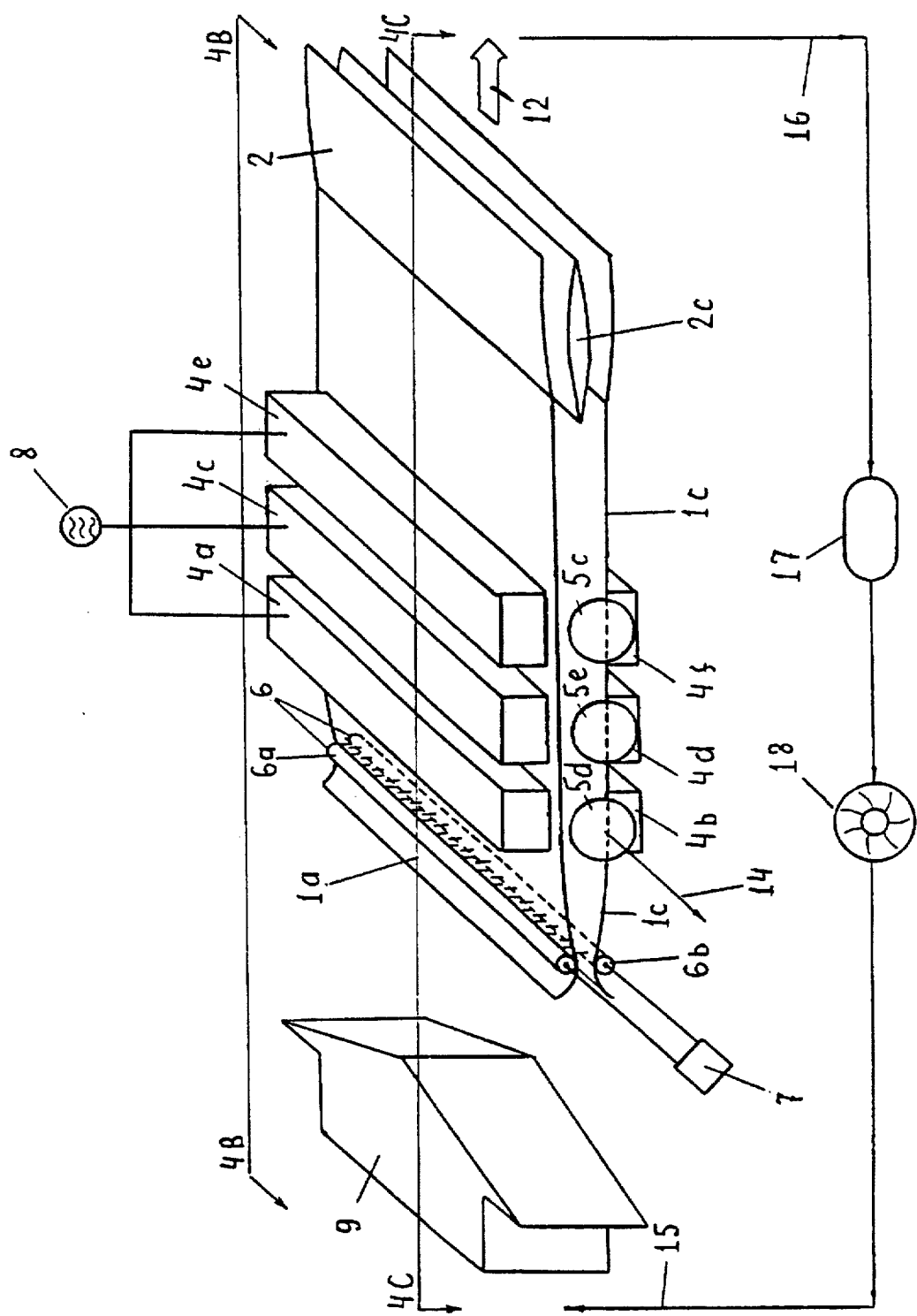
FIG. 4A is a perspective view of a laser of the present invention having a pre-ionization grid in the critical area of the nozzle and having a high frequency discharge excitation area in and coextensive with the optical resonator region.
Figure 4B:
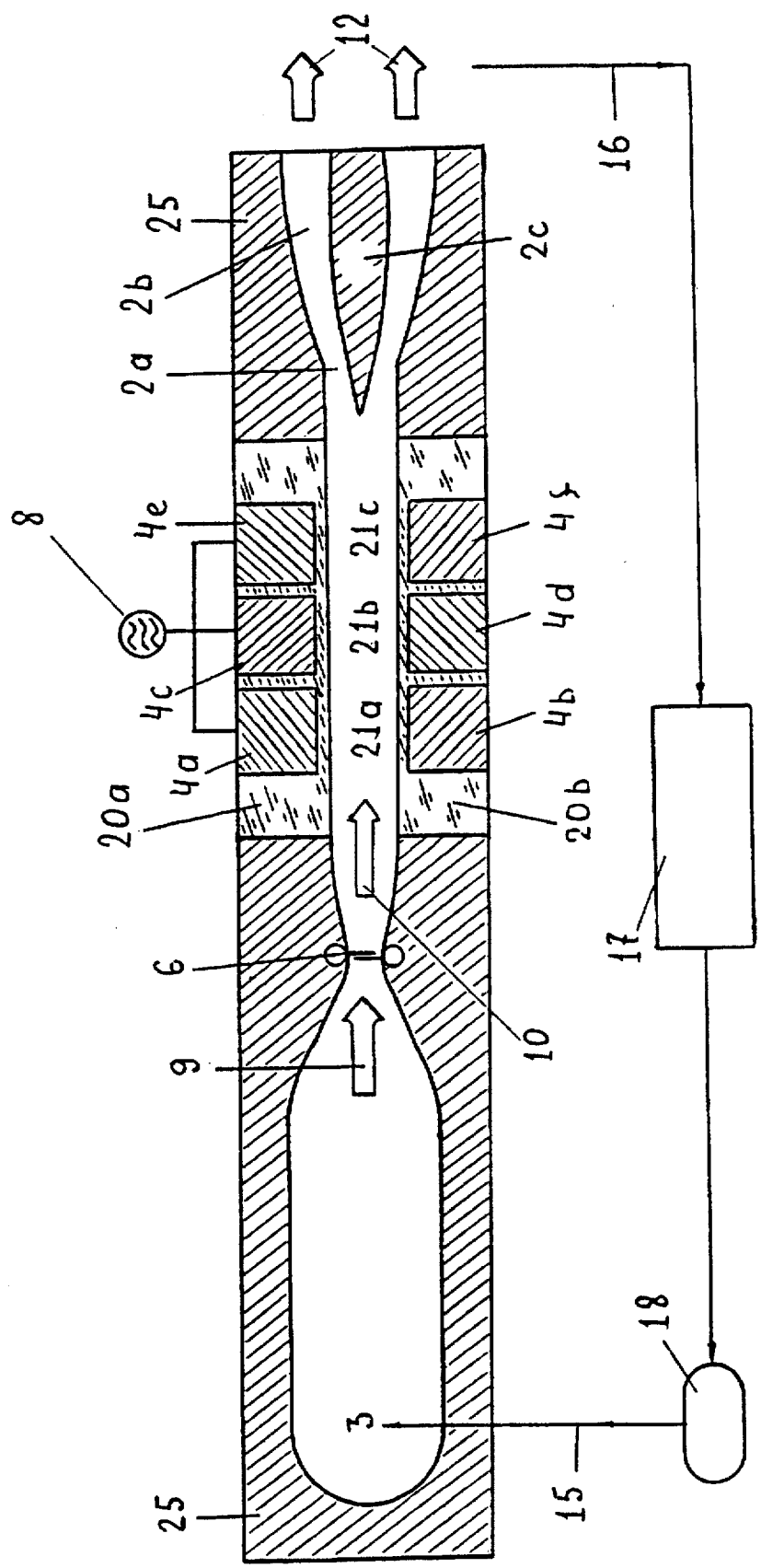
FIG. 4B is a sectional view of the laser body of FIG. 4A taken along lines 4B—4B.

As shown in FIGS. 3A and 4A, the critical area 1b of the supersonic nozzle 1, shown fully in FIG. 5, may be shortened. The discharge region 21 shown in FIG. 5, forms the first portion of the excitation region 22, thereby causing the high frequency discharge excitation to occur prior to or coinciding with the optical resonator region 23. The supersonic or subsonic flow of the active laser medium 10 downstream of the critical section 1b passes between the RF electrodes 4a and 4b which are connected to a high frequency power supply 8. The gaseous medium has been pre-ionized by a DC or AC grid 6, which in this case can be located within the shortened critical area of the nozzle 1b, or using UV tube bulbs 29a and 29b, as shown in FIG. 2B, which may be placed adjacent to cylindrical mirror reflectors 31a and 31b. The cylindrical reflectors 31a and 31b help to concentrate UV radiation from the bulbs directly to the non-ionized gas flow 9 and are covered with multidielectrical skins made of enhanced aluminum. The mirror surface of the reflector 31a or 31b is comprised of the same enhanced aluminum used for the laser body itself. This multidirectional cover exhibits good refraction of UV radiation. Utilization of UV reflectors increases the efficiency of photo-pre-ionization accomplished in the receiver or the critical area of the nozzle. Alternatively, UV bulbs of circular or square configuration may also be oppositely placed into the side plates 26, 27 of the laser body 25 within the excitation region 22 before the discharge region.

The device shown in FIGS. 3A, 3B and 3C utilizes one upper RF electrode 4a and one lower electrode 4b. Downstream of the linear electrodes are found a multi-phase resonator 5, where the laser beam phases 13 resonate and become energized utilizing the maximal laser invercy in the supersonic or subsonic active gas medium 11. The present laser system utilizes a multi-phase "open" optical resonator, which may consist of from two or more mirrors. One of the resonator mirrors 5d, as better shown in FIGS. 1C or 2C or 3C or 4C, is made slightly transmissive, so that output laser beam 14 may exit the optical resonator region 23 and be utilized.

Figure 4C:
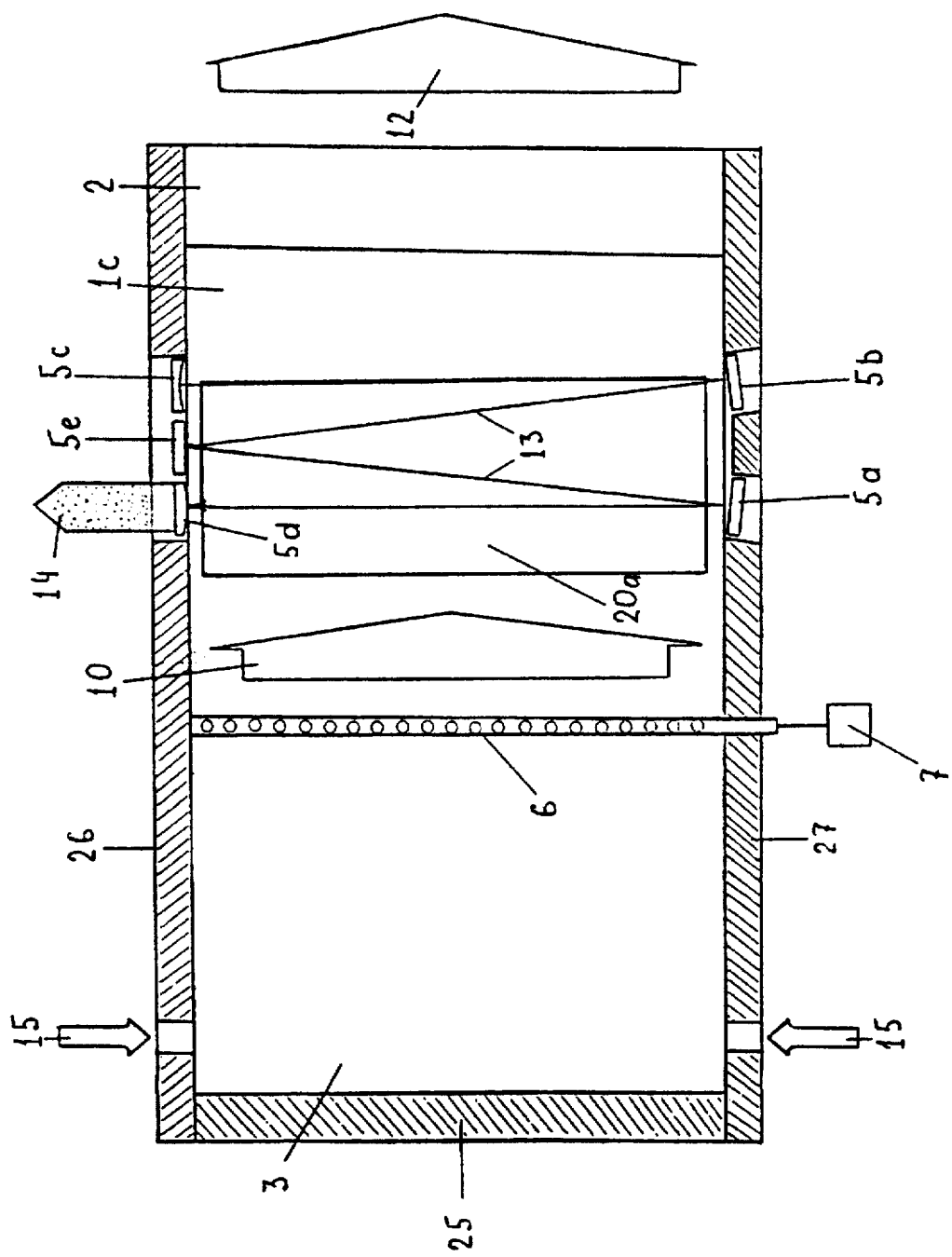
FIG. 4C is a sectional view of the central portion of the laser of FIG. 4A taken along lines 4C—4C.

As shown in FIGS. 4A, 4B and 4C, the discharge region, excitation region and optical resonator region may be combined into a single area. In this embodiment, there are one or more pairs of opposite upper and lower RF linear electrodes utilized within the optical resonator region. As shown in FIGS. 4A, there are three pairs of RF electrodes, three upper RF linear electrodes 4a, 4c and 4e, and three lower linear electrodes 4b, 4d and 4f which are all connected to a high frequency power supply 8 and which supplies RF energy with various but close frequencies for each pair of opposite electrodes. The optimal frequencies f1, f2, f3, between the three pairs of RF electrodes are related to energy changes of the active laser medium within the resonator region and distances between opposite RF electrodes.

The laser models presented in FIGS. 3 and 4 can be optimally selected for situations when the active laser mediums have a short time of ionization, excitation and/or short time life of laser invercy. Also these embodiments may be used if the laser utilizes a high static pressure of the supersonic/subsonic flow, within the supersonic area 1c of the nozzle, such as a $CO_2$ laser having a pressure of 1 bar.

The optical resonator 23 may be of different types. It may be stable with multimode structure of the output beam or, alternatively, unstable which may produce a single mode beam $TEM_{oo}$, which, from the diffraction position, is the best for a minimal focus point. The resonator mirrors, placed into the windows located within side plates 26 and 27 of the resonator region, hermetically close the windows to prevent any air seepage into the resonator region. The mirrors are placed into the windows with special angle orientations for proper reflection of the resonator laser beam phases through the resonator region. For proper sealing of the mirrors within the laser body 25, a Viton or Silicon "o" ring gaskets are used. These gaskets provide means for the mirrors to float which is necessary in order to correct resonator beam phases and mirror reflection.

The laser devices shown in FIGS. 3A and 4A have typical range of speed for gas flow in the optical region of about 0.5M to 5M, where M is the speed of sound. The range of absolute pressure in the receiver area may be typically between about 1 bar and 50 bar. The exact specifications are dependent upon the gas medium used and required output power of the laser. Utilization of high absolute pressures before the supersonic nozzle allows the laser to operate without an exhaust gas system and emit the gas directly to the atmosphere after the deceleration of the supersonic/subsonic flow in the diffuser. Additionally, the ability to combine the excitation region, discharge region and resonator region or to precede the optical resonator with the discharge region, as shown in FIGS. 3A and 4A respectively, is defined by the speed of gas flow, laser kinetics, type of transitions, speed, and life of ionization, which is related to the static pressure of the gas flow and other factors.

In the embodiments shown in FIG. 4A and 3A, following the critical area of the supersonic nozzle 1 is located the laser active region 24 which may include two or more oppositely spaced mirrors 5a, 5b, 5c and 5d. The mirrors resonate laser beam phases 13 perpendicular to the gas flow 11 taking advantage of the inversion population existent in the medium thereby producing photon amplification on the resonance transitions of the laser active medium. One of the mirrors, 5d in FIG. 3A and FIG. 4A, is made slightly transmissive allowing the laser beam phases 13 to exit the resonator and be used as the output laser beam 14. The mirrors may be adjusted as disclosed above to provide for the proper reflection angle.

Downstream of the supersonic nozzle 1 is located the supersonic diffuser 2. As best shown in FIGS. 1B, 2B, 3B and 4B, the diffuser 2 consists of two parts: a supersonic diffuser 2a and a subsonic diffuser 2b. The present diffuser 2 also has a central element 2c, which creates two shock deceleration of the supersonic flow, one within the supersonic area 2a and an additional deceleration of the now subsonic flow within the subsonic area 2b. Exiting the diffuser 2 is the output gas flow 12 which is captured in the return line 16, cooled in the cooling system 17 and then recycled into the receiver area via gas pump 18 and supply line 15.

The supersonic and subsonic diffuser has optimal dimensions and form thereby producing efficient use of the absolute pressure present in the gas flow. The typical efficiency of the two shock diffusers shown in the diagrams (FIGS. 1A–4C) is fairly close to the classical ideal. For a gas speed of about Mach=2, the efficiency is about 90%. This means that wave loss in the present laser system is very low. The viscous loses of kinetic energy within the gas flow depends on the Mach speed and absolute pressure of the gas within the nozzle. For a typical gas flow having a speed of about Mach=2 and an absolute pressure located within the receiver of 0.2 bar, the loss of kinetic energy is about 40%. This means that overall loss of kinetic energy within the gas flow in the laser is about 50%. The beneficial result of this design with such a 50% loss in kinetic energy is apparently due to the reduced energy requirements for increasing the pressure of the gas located in the return line for injection back into the receiver. If there is a 50% reduction in kinetic energy, i.e., 0.1 bar from the absolute pressure required in the receiver of 0.2 bar, gas pump 18 requires relatively low energy in order to increase the pressure to 0.2 bar required within the receiver. Therefore, it is apparent that the power and dimension requirements for the return line pump 18 is directly related to the diffuser 2 and aerodynamic efficiency of the overall laser device. For a typical $CO_2$ laser with an output power of 1.5 KW the return pump should have a power requirement of only 2–3 KW.

Utilization of diffuser 2 in the laser of the present invention, is not necessary in those situations when the laser operates in a low external pressure environment such as the stratosphere or in freespace.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. A high frequency discharge laser comprising:
   a receiver having a gas inlet;
   a gas medium entering said receiver through said gas inlet;
   a pre-ionizer downstream of said receiver;
   a supersonic nozzle downstream of said receiver, said nozzle having a subsonic area, a critical area and a supersonic area;
   at least one pair of high frequency discharge electrodes within said supersonic nozzle;
   an optical resonator within said supersonic nozzle downstream of said critical area and penetrated by a laser beam; and,
   a diffuser located downstream of said optical resonator.

2. The high frequency discharge laser of claim 1 wherein said optical resonator is provided with at least one transmissive mirror.

3. The high frequency discharge laser of claim 1 wherein said gas inlet is in flow communication with a gas pump.

4. The high frequency discharge laser of claim 3 wherein said gas pump circulates said gas medium within a closed circuit.

5. The high frequency discharge laser of claim 3 wherein said gas pump circulates said gas medium at a subsonic speed within said supersonic area of said nozzle.

6. The high frequency discharge laser of claim 3 wherein said gas pump circulates said gas medium at a sonic speed within said critical area of said nozzle.

7. The high frequency discharge laser of claim 1 wherein said pre-ionizer comprises a pre-ionization grid.

8. The high frequency discharge laser of claim 7 wherein said pre-ionization grid is comprised of a positive electrode and a negative electrode, said positive electrode spaced apart from said negative electrode a predetermined distance, said positive electrode having a plurality of pins extending outwardly therefrom directionally towards said negative electrode, said negative electrode having a plurality of pins extending outwardly therefrom directionally towards said positive electrode, said pins from said negative electrode and said pins from said positive electrode substantially coextensive and spaced apart a predetermined distance.

9. The high frequency discharge laser of claim 8 wherein said predetermined distance separating said pins extending from said negative electrode and said pins from said positive electrode is about 0.04 inch.

10. The high frequency discharge laser of claim 7 wherein said pre-ionization grid is connected to a direct current power supply.

11. The high frequency discharge laser of claim 7 wherein said pre-ionization grid is connected to an alternating current power supply.

12. The high frequency discharge laser of claim 1 wherein said pre-ionizer comprises at least one ultraviolet source.

13. The high frequency discharge laser of claim 12 wherein said ultraviolet source is comprised of a first and a second ultraviolet bulb, said bulbs being opposed spaced relative within said receiver and in electrical communication with a power supply source.

14. The high frequency discharge laser of claim 1 wherein said supersonic nozzle has a logarithmic profile with an opening angle of about 0.5 degrees within said optical resonator.

15. The high frequency discharge laser of claim 1 wherein said at least one pair of electrodes comprises at least one upper and at least one lower RF linear electrode.

16. The high frequency discharge laser of claim 15 wherein said upper and said lower electrodes are oppositely spaced within said supersonic nozzle.

17. The high frequency discharge laser of claim 15 wherein said upper and lower linear electrodes do not extend the full cross sectional width of said nozzle.

18. The high frequency discharge laser of claim 15 wherein said electrodes are comprised of aluminum.

19. The laser of claim 18 wherein said electrodes have a non-conductive material located on their surface.

20. The high frequency discharge laser of claim 15 wherein said upper electrode and said lower electrode in electrical communication with an RF resonator, said RF resonator in electrical communication with an RF power supply.

21. The high frequency discharge laser of claim 1 wherein said electrodes are surrounded on their perimeter by dielectric material.

22. The high frequency discharge laser of claim 21 wherein said dielectric material is comprised of TEFLON.

23. The high frequency discharge laser of claim 21 wherein said dielectric material is comprised of solid silicon.

24. The high frequency discharge laser of claim 21 wherein said dielectric material is comprised of ceramic.

25. The high frequency discharge laser of claim 1 wherein said at least one pair of electrodes comprises a plurality of oppositely spaced upper and lower RF linear electrodes.

26. The high frequency discharge laser of claim 25 wherein said plurality of upper and lower electrodes are substantially surrounded by a dielectric material.

27. The high frequency discharge laser of claim 25 wherein said plurality of upper and lower electrodes are coextensive with said optical resonator.

28. The high frequency discharge laser of claim 25 wherein said upper and lower linear electrodes do not extend the full cross sectional width of said nozzle.

29. The high frequency discharge laser of claim 1 wherein said gas medium is combined with a pre-ionization vapor including Cesium.

30. The high frequency discharge laser of claim 1 wherein said gas medium is combined with a pre-ionization vapor including Dimethilaniline.

31. The high frequency discharge laser of claim 1 wherein said gas medium flows at a supersonic speed within said supersonic area of said nozzle.

32. The high frequency discharge laser of claim 1 wherein said gas medium is comprised of at least a portion of carbon dioxide, nitrogen, helium, xenon or mixtures thereof.

33. The high frequency discharge laser of claim 1 wherein said gas medium is comprised of at least a portion of neon, helium or mixtures thereof.

34. The high frequency discharge laser of claim 1 wherein said gas medium is comprised of at least a portion of carbon monoxide, oxygen, xenon or mixtures thereof.

35. The high frequency discharge laser of claim 1 wherein said gas medium is comprised of at least a portion of carbon monoxide and xenon or mixtures thereof.

36. The high frequency discharge laser of claim 1 wherein said gas medium includes argon.

37. The high frequency discharge laser of claim 36 wherein argon is combined with xenon.

38. The high frequency discharge laser of claim 36 wherein argon is combined with helium.

39. The high frequency discharge laser of claim 36 wherein argon is combined with helium and xenon.

40. The high frequency discharge laser of claim 1 wherein said gas medium is comprised of at least a portion of krypton and helium or mixtures thereof.

41. The high frequency discharge laser of claim 1 wherein said diffuser is a two shock diffuser.

42. The high frequency discharge laser of claim 1 wherein said diffuser is comprised of a central element dividing said gas into an upper and lower exhaust path.

43. The high frequency discharge laser of claim 1 wherein said laser has an active region downstream of said critical area of said nozzle.

44. The high frequency discharge laser of claim 1 wherein said laser is comprised of a single piece central body portion and a first and second mono-plate side portion.

45. The high frequency discharge laser of claim 44 wherein said central body portion and said first and second side portion are comprised of aluminum.

46. The high frequency discharge laser of claim 44 wherein said central body portion and said first and second side portions are comprised of an aluminum alloy.

47. The high frequency discharge laser of claim 44 wherein said central body portion and said first and second side portions have an interior of non-conductive material.

48. A high frequency discharge laser comprising:
   a gas inlet located within a receiver, said gas inlet being in flow communication with a gas source, said gas inlet providing a gas medium in said receiver;
   a pre-ionizer downstream of and in flow communication with said receiver;
   a supersonic nozzle downstream of and in flow communication with said receiver, said supersonic nozzle having a critical area adjacent to said receiver;
   high frequency discharge electrodes downstream of and in flow communication with said receiver;
   an optical resonator downstream of and in flow communication with said critical area of said nozzle;
   a laser beam penetrating said optical resonator; and,
   a two shock supersonic diffuser downstream of and in flow communication with said optical resonator.

49. The laser of claim 48 wherein said pre-ionizer is comprised of a pre-ionization grid.

50. The pre-ionization grid of claim 49 wherein said pre-ionization grid includes a positive and a negative electrode.

51. The laser of claim 48 wherein said pre-ionizer includes an ultraviolet radiation source.

52. The laser of claim 51 wherein said ultraviolet radiation source is comprised of spaced opposed ultraviolet bulbs.

53. The laser of claim 52 wherein said laser includes cylindrical ultraviolet reflectors surrounding at least a portion of each of said bulbs, said ultraviolet reflectors having multidielectrical skins.

54. The laser of claim 48 wherein said high frequency discharge electrodes are comprised of at least one pair of spaced opposed RF linear electrodes.

55. The laser of claim 54 wherein said linear electrodes are located within said optical resonator.

56. The laser of claim 54 wherein said linear electrodes are located downstream of said critical area of said nozzle and upstream of said optical resonator.

57. The laser of claim 54 wherein each of said linear electrodes are covered on their perimeter by a dielectric material.

58. The laser of claim 57 wherein said dielectric material covering the perimeter of said linear electrodes has a predetermined thickness at least two times the distance between said upper and lower electrode.

59. The laser of claim 54 wherein said linear electrodes are water cooled.

60. The laser of claim 54 wherein a predetermined gap is formed between the sides of said laser and said linear electrodes thereby forming a cool buffer flow downstream of said electrodes.

61. The laser of claim 60 wherein said predetermined gap is about 0.6 inches.

62. The laser of claim 54 wherein said linear electrodes are located within said critical area of said nozzle.

63. The laser of claim 48 wherein said pre-ionizer is located downstream of said receiver.

64. The laser of claim 48 wherein said pre-ionizer is located within said critical area of said nozzle.

65. The laser of claim 48 wherein said two shock supersonic diffuser has a central element displaced between an upper exhaust channel and a lower exhaust channel.

66. The laser of claim 48 wherein said laser is comprised of a three piece body, said three piece body further comprised of a central body portion and first and second side plate members on opposed sides of said central body portion.

67. The laser of claim 48 wherein said high frequency discharge electrodes are integrated with an RF resonator, said electrodes and resonator electrically connected to an RF power supply by a coaxial RF cable.

68. The laser of claim 48 wherein said high frequency discharge electrodes are integrated with an RF resonator and an RF power amplifier, said RF power amplifier electrically connected to a DC power supply and power supply controller.

69. The laser of claim 48 further comprising a gas pump, wherein said pump circulates said gas medium at a speed of about 0.5 Mach to about 5 Mach within said optical resonator.

70. The laser of claim 48 further comprising a gas pump, wherein said pump adjusts the pressure within said receiver to be from about 0.1 Bar to about 50 Bar.

* * * * *